(12) United States Patent
Clark et al.

(10) Patent No.: US 6,582,722 B1
(45) Date of Patent: *Jun. 24, 2003

(54) AMINO ACID CHELATE FOR THE EFFECTIVE SUPPLEMENTATION OF CALCIUM, MAGNESIUM AND POTASSIUM IN THE HUMAN DIET

(75) Inventors: George H. Clark, Woburn, MA (US); Mary Ann Clark, Woburn, MA (US)

(73) Assignee: Mac Farms, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/660,048

(22) Filed: Sep. 12, 2000

Related U.S. Application Data

(60) Provisional application No. 60/153,650, filed on Sep. 13, 1999.

(51) Int. Cl.⁷ ................... A61K 47/00; A23K 1/175; A23L 1/30
(52) U.S. Cl. ................... 424/439; 424/400; 426/72; 426/74
(58) Field of Search ................ 424/400, 439; 426/72, 74, 262

(56) References Cited

U.S. PATENT DOCUMENTS

| | | |
|---|---|---|
| 4,212,893 A | 7/1980 | Takahata |
| 4,264,638 A | 4/1981 | Sirett et al. |
| 4,460,616 A | 7/1984 | Rialland et al. |
| 4,737,375 A | 4/1988 | Nakel et al. |
| 4,738,856 A | 4/1988 | Clark |
| 4,804,552 A | 2/1989 | Ahmed |
| 4,842,884 A | 6/1989 | Bookwalter et al. |
| 4,919,960 A | 4/1990 | Ahmed et al. |
| 4,980,182 A | 12/1990 | Kwon et al. |
| 5,200,226 A | 4/1993 | Rodriguez |
| 5,202,145 A | 4/1993 | Wisler et al. |
| 5,366,751 A | 11/1994 | Pordy |
| 5,413,803 A | 5/1995 | Chung |
| 5,436,020 A | 7/1995 | Kuwata |
| 5,607,714 A | 3/1997 | Connolly |
| 5,624,700 A | 4/1997 | Ogden |
| 5,648,112 A | 7/1997 | Yang et al. |
| 5,665,415 A | 9/1997 | Kligerman |
| 5,817,351 A | 10/1998 | DeWille et al. |
| 5,834,045 A | 11/1998 | Keating |
| 6,403,129 B1 * | 6/2002 | Clark et al. ............. 426/477 |

* cited by examiner

Primary Examiner—Thurman K. Page
Assistant Examiner—Charesse Evans
(74) Attorney, Agent, or Firm—Lorusso Loud & Kelly LLP

(57) ABSTRACT

Amino acid chelates for enhancing the absorption and assimilation of essential minerals in the human diet. Calcium, magnesium and potassium picolinic acid salts are disclosed as food and beverage supplements to improve the nutritive capacity of food stuffs and beverages. A method of enhancing the nutritive value of food and beverages is also described.

14 Claims, No Drawings

AMINO ACID CHELATE FOR THE EFFECTIVE SUPPLEMENTATION OF CALCIUM, MAGNESIUM AND POTASSIUM IN THE HUMAN DIET

CROSS-REFERENCE TO RELATED APPLICATION

This application claims the benefit of U.S. Provisional Application Ser. No. 60/153,650, filed Sep. 13, 1999.

FIELD OF THE INVENTION

This invention relates to unique calcium, magnesium and potassium chelates and a method and use of such chelates for the supplementation of essential minerals in the human diet.

BACKGROUND OF THE INVENTION

The public is becoming increasingly aware of the role of nutrition in the maintenance of health. The science of nutrition deals with the processes by which food and its components are made available to and assimilated within the human system to help it meet the energy requirements needed to keep the body in an optimum functional state. Although overall nutrition is important, the levels of bioavailable calcium, magnesium and potassium in the daily diet affects healthy bone growth, muscle function, cardiac function, blood clotting, blood pressure, heart rhythm, permeability of cell membranes, acid-base balance and $CO_2$ transport. The following summary illustrates the importance of having proper levels of these essential minerals to maintain human health:

| Element & Total Amt In Human Body | RDA | Absorption & Metabolism | Metabolic Functions | Manifestation of Deficiency |
|---|---|---|---|---|
| CALCIUM (22 gm/Kg) | 1000 mg | Poorly absorbed from foods (20%–40%) Absorption from milk enhanced by Vit D, lactose & acidity. Absorption hindered by excessive fats, phytates, oxalates | Formation of bones, teeth blood clotting, cardiac function, neuromuscular irritability. | Rickets (children), Osteoporosis, High Blood Pressure |
| MAGNESIUM | 350 mg (male) 390 mg (female) | Absorbed readily from some foods. Needed by Calcium to enhance transport | Decrease neuromuscular irritability. Co-factor for $PO_4$ transferring enzymes. | Muscular Tremor, Confusion, Vasoirritability. |
| POTASSIUM | 1.9–5.6 gm | Readily absorbed from some foods. | Acid-base balance Water balance. $CO_2$ Transport Neuromuscular irritability. | Acidosis, Renal Damage, Cardiac Arrest |

Unless expressly stated otherwise, as used herein, all liquid components are measured in liters or fractions thereof and all solid components are measured in grams or fractions thereof.

A major problem exists in North America for adults and youth eat increasingly routine amounts of fast foods that contain high amounts of fats, sodium and phosphates. These compete and interfere with calcium, magnesium and potassium absorption and create deficiencies in the daily amounts of these minerals that are bioavailable for essential use by the human body.

What is needed and what we have invented is a chelate formed between calcium and picolinic acid and/or between magnesium and picolinic acid and/or a complex formed between potassium and picolinic acid.

SUMMARY OF THE INVENTION

In its broadest aspect, the calcium, magnesium and potassium chelates of the invention have a selective rate of absorption and provide calcium, magnesium and potassium supplements which have a high bioavailability in the human system.

Picolinic acid is a mono-carboxylic acid formed naturally during the metabolism of tryptophan by what is known as the Kynurenine pathway. The Kynurenine pathway is comprised of two major degradation pathways as is well known in the art. Each pathway produces different intermediate and end products.

Tryptophan is an essential amino acid in the human system. During metabolism it forms many intermediates depending on which of the two major degradation pathways it follows in the Kynurenine pathway. One of the intermediates produced is picolinic acid.

Picolinic acid from animal source may be used to form an amino acid chelate with calcium, magnesium or potassium. In the case of calcium or magnesium, one or more donor atoms from picolinic acid (the ligand) combines with the metal ion through the process of coordinate covalent bonding to form a ring-like molecule (metal ion chelate). In the case of potassium, instead of a chelate, a metal complex is formed. In this case a heterocyclic ring is not created but the same coordinate bond exists. The difference between the calcium or magnesium picolinic acid chelate and the potassium picolinic acid complex is that in the case of the complex, two donor atoms within the ligand molecules do not bond potassium.

When the disclosed chelate between calcium, magnesium or potassium and picolinic acid is ingested and passes through the stomach and intestines (the ionic absorption sites are in the intestines), the calcium, magnesium or potassium is protected from entering into the multitude of chemical reactions which are normal for minerals derived from the ingestion of soluble salts. The result is a much higher absorption of the calcium, magnesium or potassium that has been chelated to picolinic acid.

DESCRIPTION OF THE ILLUSTRATED EMBODIMENT

The calcium picolinate composition of this invention is designed to be added to a food per 2 oz. serving of from about 0.001 mg. to about 10,000 mg. and/or added to a beverage per 2 oz. serving of from about 0.001 mg. to about 10,000 mg. and/or added to a pharmaceutical preparation per mg. of from about 0.001 mg. to about 10,000 mg. and/or taken as a dietary supplement from about 0.001 mg. to about 10,000 mg. This calcium picolinate preparation will therefore provide a source of nutritional calcium with high bioavailability.

The magnesium picolinate composition of this invention is designed to be added to a food per 2 oz. serving of from about 0.001 mg. to about 10,000 mg. and/or added to a beverage per 2 oz. serving of from about 0.001 mg. to about 10,000 mg. and/or added to a pharmaceutical preparation per mg. of from about 0.001 mg. to about 10,000 mg. and/or taken as a dietary supplement from about 0.001 mg. to about 10,000 mg. This magnesium picolinate preparation will therefore provide a source of nutritional magnesium with high bioavailability.

The potassium picolinate composition of this invention is designed to be added to a food per 2 oz. serving of from about 0.001 mg. to about 10,000 mg. and/or added to a beverage per 2 oz. serving of from about 0.001 mg. to about 10,000 mg. and/or added to a pharmaceutical preparation per mg. of from about 0.001 mg. to about 10,000 mg. and/or taken as a dietary supplement from about 0.001 mg. to about 10,000 mg. This potassium picolinate preparation will therefore provide a source of nutritional potassium with high bioavailability.

These particular chelates or in the case of potassium, a complex, are non-toxic, tightly bound, non-irritating to the buccal cavity, alimentary canal, gastric mucosa or intestinal tract. These particular chelates, or in the case of potassium, the complex, do not impede the absorption of water from the intestinal tract. They are easily absorbed and are quickly transferred to the tissues whereupon any released calcium ions, magnesium ions and/or potassium ions, enter the cells to replace calcium, magnesium and/or potassium, respectively, which may have been depleted. The amino acid (picolinic acid) is then excreted in the urine. These chelate and complex substances are physiologically compatible with the systems of humans.

Our invention will be illustrated by the following suggested examples that are given by way of illustration only. All parameters submitted in these examples are not to be construed to unduly limit the scope of this invention.

It is to be appreciated that some tests applicable to human beings yield results which at best give merely qualitative results due to the subjective sensations of the human subjects. It is further to be appreciated that subjective sensations may vary so substantially from individual to individual that it is difficult to delineate well defined, quantitative results. Nevertheless, though test results are evidence of subjective sensations, it is believed they are of objective value it unanimously elicited from a large number (e.g. 100 or more) of human subjects from different ethnic backgrounds and age groups.

EXAMPLE I

A milk or milk-based beverage is prepared in a manner such as described in our co-pending application U.S. Ser. No. 09/473,252, incorporated in full herein by reference. Calcium picolinate is added to the beverage such that each 2 oz. contains 0.001 mg. to 10,000 mg.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such a result will demonstrate that the calcium in the chelate, calcium picolinate, exhibits a high degree of bioavailability in the beverage preparations.

EXAMPLE II

The experiment in Example I is repeated using a carbonated soft drink beverage containing per 2 oz. from about 0.001 mg. to about 1 0,000 mg. calcium picolinate.

One hundred (1 00) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such a result will demonstrate that the calcium in the chelate, calcium picolinate, exhibits a high degree of bioavailability in the beverage preparations.

EXAMPLE III

The experiment in Example II is repeated using a fruit or vegetable juice or a fruit or vegetable juice based beverage containing per 2 oz. from about 0.001 mg. to about 10,000 mg. calcium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the calcium in the chelate, calcium picolinate, exhibits a high degree of bioavailability in the beverage preparations.

EXAMPLE IV

The experiment in Example III is repeated using bottled drinking water which is filtered, purified or distilled or tap water containing per 2 oz. of solution from about 0.001 mg. to about 10,000 mg. calcium picolinate.

One hundred (100) human subjects were administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the calcium in the chelate, calcium picolinate, exhibits a high degree of bioavailability in the beverage preparations.

EXAMPLE V

The experiment in Example IV is repeated using a beverage, which contains a sweetener (nutritive or non-nutritive), an acidulant, a flavoring agent and/or flavor potentiator, a color additive and a preservative. The sweetener is selected from the group consisting of sucrose, high fructose corn syrup, invert sugars, crystalline fructose, fructose polymers, aspartame, glucose, glucose polymers, sucralose, Saccharine® and mixtures thereof. Preferably, the sweetener agent is selected from the group consisting of sucrose, crystalline fructose, fructose polymers, glucose, glucose polymers, Aspartame®, sucralose and/or mixtures thereof. Most preferably, the sweetener agent for the non-dietetic formulation is crystaline fructose and for the dietetic formulation is sucralose or Aspartame® and/or mixtures thereof.

Crystalline fructose is the preferred sweetener agent for the invention in the non-dietetic form. Fructose is absorbed by humans through a facilitated diffusion process. Its movement across the intestinal membrane is more rapid than would be expected from simple diffusion. Facilitated diffusion involves the intermediary formation of a complex with a specific transport or carrier protein. If crystalline fructose is used as the sweetening agent, from about 0.01 g to about 50 g is used per 354 ml of beverage solution. If fructose polymers are used as a sweetening agent for this invention, from about 0.1 g to about 1000 g is used per 354 ml of beverage solution. Fructose polymers, as is known in the art, impart enhanced nutritional activity due to the way the substance is transported through the intestinal tract and processed by the body.

If sucrose is used as the sweetener, from about 0.01 g to about 100 g is used per 354 ml of beverage solution. If Aspartame® is used as the sweetener, from about 0.05 g to about 30 g is used per 354 ml of beverage solution. If sucralose is used as the sweetener, from about 0.01 g to about 30 g is used per 354 ml of beverage solution. If glucose polymers are used as the sweetener, from about 0.01 g to about 1000 g is used per 354 ml of beverage solution. If glucose is used as the sweetener, from about 0.01 g to about 100 g is used per 354 ml of beverage solution. If Saccharine® is used as the sweetener, from about 0.01 g to about 10 g is used per 354 ml of beverage solution. If crystalline fructose, fructose polymers, glucose, glucose polymers, sucrose, Aspartame®, Saccharine®, sucralose and/or mixtures thereof are used as the sweetener, from about 0.01 g to about 200 g is used per 354 ml of beverage solution.

The flavoring agent is chosen from the following: chocolate fudge, chocolate, vanilla, strawberry, prairie berry, mocha, latte, peach, almond, coconut, raspberry, saskatoon berry, plains berry, apple, orange, butterscotch, coffee, blueberry and/or mixtures thereof. Flavors and/or mixtures thereof chosen from the list above will be added from about 0.01 g to about 50 g per 354 ml of beverage solution.

The preservative used is preferably natural and bacteriostatic. The preferred preservative is benzoic acid and/or a benzoate compound such as sodium benzoate, potassium benzoate, calcium benzoate and/or magnesium benzoate. When used in any and all embodiments of the invention, these compounds comprise from about 0.15 g to about 0.70 g of benzoic acid, sodium benzoate, potassium benzoate, calcium benzoate, magnesium benzoate and/or mixtures thereof per 354 ml of beverage solution.

To each 2 oz. of beverage solution is added from about 0.001 mg. to about 10,000 mg. calcium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the calcium in the chelate, calcium picolinate, exhibits a high degree of bioavailability in the beverage preparations.

EXAMPLE VI

The experiment in Example V is repeated using a sports beverage, electrolyte replacement beverage, fluid replacement beverage or nutritional supplement beverage to each 2 oz. beverage solution is added from about 0.001 mg. to about 10,000 mg. calcium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the calcium in the chelate, calcium picolinate, exhibits a high degree of bioavailability in the beverage preparations.

EXAMPLE VII

The experiment in Example VI is repeated using a coffee beverage, caffeinated or decaffeinated, freshly brewed or instant. To each 2 oz. of beverage solution is added from about 0.001 mg. to about 10,000 mg. calcium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the calcium in the chelate, calcium picolinate, exhibits a high degree of bioavailability in the beverage preparations.

EXAMPLE VIII

The experiment in Example VII is repeated using a tea beverage, caffeinated or decaffeinated, freshly brewed or instant, herbal, green, Oolong or black. To each 2 oz. of beverage solution is added from about 0.001 mg. to about 10,000 mg. calcium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the calcium in the chelate, calcium picolinate, exhibits a high degree of bioavailability in the beverage preparations.

EXAMPLE IX

The experiment in Example VIII is repeated using a nonalcoholic beer or wine. To each 2 oz. of beverage solution is added from about 0.001 mg. to about 10,000 mg. calcium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the calcium in the chelate, calcium picolinate, exhibits a high degree of bioavailability in the beverage preparations.

EXAMPLE X

The experiment in Example IX is repeated using a soy or rice based beverage. To each 2 oz. of beverage solution is added from about 0.001 mg. to about 10,000 mg. calcium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid. Such results will demonstrate that the calcium in the chelate, calcium picolinate, exhibits a high degree of bioavailability in the beverage preparations.

EXAMPLE XI

The experiment in Example X is repeated using the following foods containing per 2 oz. from about 0.001 mg. to about 10,000 mg. calcium picolinate. The same results as in Example X are expected.

Baby foods, baking sodas and powders, baked goods such as breads, cookies, cakes, crackers, pastries and pies, breakfast mixes, butters and margarines, cake, muffin and bread mixes, prepared icings, pie crust mix, cookie, brownie, pancake and waffle mixes, candies, canned fruits, vegetables and beans, canned pie fillings, canned meats and fish, cheeses, cocktail mixes, condiments, dried milk and flavored dried milk products, enriched chocolates and butterscotch for baking, enriched salt products, enriched seasonings, flours and meals, frozen prepared dinners, fruit sauces, gravies, gelatins and puddings, hot and cold cereals, ice creams, sherbets, yogurts and sorbets, jams, jellies, kosher foods, Mexican foods, Oriental foods, oils for salads and cooking, pastas, pectins, pizzas, prepared meats for cold cuts, prepared salads, preserves, sauces, salad dressings, soups, stews and chilies, special popcorn preparations, sweeteners both nutritive and non-nutritive, supplements to frozen foods, vegetables and desserts, syrups, and vinegars to name a few.

EXAMPLE XII

The experiment in Example XI is repeated using pharmaceutical preparations such as tablets, powders or capsules for oral administration which contain from about 0.001 mg. to about 10,000 mg. calcium picolinate per unit and/or suppositories for rectal administration containing from about 0.001 mg. 0.001mg about 10,000 mg. calcium picolinate per unit and/or syrups, elixirs, extracts, tonics, or other liquid or semi-solid preparations for oral administration containing per 2 oz. from about 0.001 mg. to about 10,000 mg. calcium picolinate and/or injectable preparations and/or topical preparations containing from about 0.001 mg. to about 10,000 mg. calcium picolinate per dose. The same results as in Example XI are expected.

EXAMPLE XIII

A milk or milk based beverage is prepared in a manner such as described in our copending patent application U.S. Ser. No. 09/473,252, the contents of which are incorporated in full herein by reference. Potassium picolinate is added such that each 2 oz. contains 0.001 mg. to 0.001 mg.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XIV

The experiment in Example XII is repeated using a carbonated soft drink beverage containing per 2 oz. from about 0.001 mg. to about 10,000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XV

The experiment in Example XIV is repeated using a fruit or vegetable juice or a fruit or vegetable juice based beverage containing per 2 oz. from about 0.001 mg. to about 10,000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XVI

The experiment in Example XV is repeated using bottled drinking water which is filtered, purified or distilled or tap water containing per 2 oz. of solution from about 0.001 mg. to about 10,000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XVII

The experiment in Example XIV is repeated using a beverage, which contains a sweetener (nutritive or non-nutritive), an acidulant, a flavoring agent and/or flavor potentiator, a color additive and a preservative. The sweetener is selected from the group consisting of sucrose, high fructose corn syrup, invert sugars, crystalline fructose, fructose polymers, aspartame, glucose, glucose polymers, sucralose, Saccharine® and mixtures thereof. Preferably, the sweetener agent is selected from the group consisting of sucrose, crystalline fructose, fructose polymers, glucose, glucose polymers, Aspartame®, sucralose and/or mixtures thereof. Most preferably, the sweetener agent for the non-dietetic formulation is crystaline fructose and for the dietetic formulation is sucralose or Aspartame® and/or mixtures thereof.

Crystalline fructose is the preferred sweetener agent for the invention in the non-dietetic form. Fructose is absorbed by humans through a facilitated diffusion process. Its movement across the intestinal membrane is more rapid than would be expected from simple diffusion. Facilitated diffusion involves the intermediary formation of a complex with a specific transport or carrier protein. If crystalline fructose is used as the sweetening agent, from about 0.01 g to about 50 g is used per 354 ml of beverage solution. If fructose polymers are used as a sweetening agent for this invention, from about 0.1 g to about 1000 g is used per 354 ml of beverage solution. Fructose polymers, as is known in the art, impart enhanced nutritional activity due to the way the substance is transported through the intestinal tract and processed by the body.

If sucrose is used as the sweetener, from about 0.01 g to about 100 g is used per 354 ml of beverage solution. If Aspartame® is used as the sweetener, from about 0.05 g to about 30 g is used per 354 ml of beverage solution. If sucralose is used as the sweetener, from about 0.01 g to about 30 g is used per 354 ml of beverage solution. If glucose polymers are used as the sweetener, from about 0.01 g to about 1000 g is used per 354 ml of beverage solution. If glucose is used as the sweetener, from about 0.01 g to about 100 g is used per 354 ml of beverage solution. If Saccharine® is used as the sweetener, from about 0.01 g to about 10 g is used per 354 ml of beverage solution. If crystalline fructose, fructose polymers, glucose, glucose polymers, sucrose, Aspartame®, Saccharine®, sucralose and/or mixtures thereof are used as the sweetener, from about 0.01 g to about 200 g is used per 354 ml of beverage solution.

The flavoring agent is chosen from the following: chocolate fudge, chocolate, vanilla, strawberry, prairie berry, mocha, latte, peach, almond, coconut, raspberry, saskatoon berry, plains berry, apple, orange, butterscotch, coffee, blueberry and/or mixtures thereof. Flavors and/or mixtures thereof chosen from the list above will be added from about 0.01 g to about 50 g per 354 ml of beverage solution.

The preservative used is preferably natural and bacteriostatic. The preferred preservative is benzoic acid and/or a benzoate compound such as sodium benzoate, potassium benzoate, calcium benzoate and/or magnesium benzoate. When used in any and all embodiments of the invention, these compounds comprise from about 0.15 g to about 0.70 g of benzoic acid, sodium benzoate, potassium benzoate, calcium benzoate, magnesium benzoate and/or mixtures thereof per 354 ml of beverage solution.

To each 2 oz. of beverage solution is added from about 0.001 mg. to about 10,0000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XVIII

The experiment in Example XVII is repeated using a sports beverage, electrolyte replacement beverage, fluid replacement beverage or nutritional supplement beverage to each 2 oz. beverage solution is added from about 0.001 mg. to about 10,0000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picoline, exhibits a high degree of bioavailability in the beverage preparations.

EXAMPLE XIX

The experiment in Example XVIII is repeated using a coffee beverage, caffeinated or decaffeinated, freshly brewed or instant. To each 2 oz. of beverage solution is added from about 0.001 mg. to about 10,000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XX

The experiment in Example XIX is repeated using a tea beverage, caffeinated or decaffeinated, freshly brewed or instant, herbal, green, Oolong or black. To each 2 oz. of beverage solution is added from about 0.001 mg. to about 10,000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XXI

The experiment in Example XX is repeated using a nonalcoholic beer or wine. To each 2 oz. of beverage solution is added from about 0.001 mg. to about 10,000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XXII

The experiment in Example XXI is repeated using a soy or rice based beverage. To each 2 oz. of beverage solution is added from about 0.001 mg. to about 10,000 mg. potassium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the potassium in the complex, potassium picolinate, exhibits a high degree of bioavailability in the beverage preparations.

EXAMPLE XXIII

The experiment in Example XXII is repeated using the following foods containing per 2 oz. from about 0.001 mg. to about 10,000 mg. potassium picolinate. The same results as in Example XXII are expected.

Baby foods, baking sodas and powders, baked goods such as bread, cookies, cakes, crackers, pastries and pies, breakfast mixes, butters and margarines, cake, muffin and bread mixes, prepared icings, pie crust mix, cookie, brownie, pancake and waffle mixes, candies, canned fruits, vegetables and beans, canned pie fillings, canned meats and fish, cheeses, cocktail mixes, condiments, dried milk and flavored dried milk products, enriched chocolates and butterscotch for baking, enriched salt products, enriched seasonings, flours and meals, frozen prepared dinners, fruit sauces, gravies, gelatins and puddings, hot and cold cereals, ice creams, sherbets, yogurts and sorbets, jams, jellies, kosher foods, Mexican foods, Oriental foods, oils for salads and cooking, pastas, pectins, pizzas, prepared meats for cold cuts, prepared salads, preserves, sauces, salad dressings, soups, stews and chillies, special popcorn preparations, sweeteners both nutritive and non-nutritive, supplements to frozen foods, vegetables and desserts, syrups and vinegars to name a few.

EXAMPLE XXIV

The experiment in Example XXIII is repeated using pharmaceutical preparations such as tablets, powders or capsules for oral administration which contain from about 0.001 mg. to about 10,000 mg. potassium picolinate per unit and/or suppositories for rectal administration containing from about 0.001 mg. to about 10,000 mg. potassium picolinate per unit and/or syrups, elixirs, extracts, tonics, or other liquid or semi-solid preparations for oral administration containing per 2 oz. from about 0.001 mg. to about 10,000 mg. potassium picolinate and/or injectable preparations and/or topical preparations containing from about 0.001 mg. to about 10,000 mg. potassium picolinate. The same results as in Example XXIII are expected.

EXAMPLE XXV

Milk or a milk based beverage is prepared in a manner such as described in our co-pending application U.S. Ser. No. 09/473,252, incorporated in full herein by reference. Magnesium picolinate is added such that each 2 oz. contains 0.001 mg. to 10,000 mg.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXVI

The experiment in Example XXV is repeated using a carbonated soft drink beverage containing per 2 oz. from stout. 0.001 mg. to about 10,000 mg. magnesium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXVII

The experiment in Example XXVI is repeated using a fruit or vegetable juice or a fruit or vegetable juice based beverage containing per 2 oz. from about 0.001 mg. to about 10,000 mg. magnesium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXVIII

The experiment in Example XXVII is repeated using bottled drinking water, which is filtered, purified or distilled, or tap water containing per 2 oz. of solution from about 0.001 ma. to about 10,000 mg. magnesium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXIX

The experiment in Example XXVIII is repeated using a beverage, which contains a sweetener (nutritive or nonnutritive), an acidulant, a flavoring agent and/or flavor potentiator, a color additive and a preservative. The sweetener is selected from the group consisting of sucrose, high fructose corn syrup, invert sugars, crystalline fructose, fructose polymers, aspartame, glucose, glucose polymers, sucralose, Saccharine® and mixtures thereof. Preferably, the sweetener agent is selected from the group consisting of sucrose, crystalline fructose, fructose polymers, glucose, glucose polymers, Aspartame®, sucralose and/or mixtures thereof. Most preferably, the sweetener agent for the non-dietetic formulation is crystaline fructose and for the dietetic formulation is sucralose or Aspartame® and/or mixtures thereof.

Crystalline fructose is the preferred sweetener agent for the invention in the non-dietetic form. Fructose is absorbed by humans through a facilitated diffusion process. Its movement across the intestinal membrane is more rapid than would be expected from simple diffusion. Facilitated diffusion involves the intermediary formation of a complex with a specific transport or carrier protein. If crystalline fructose is used as the sweetening agent, from about 0.01 g to about 50 g is used per 354 ml of beverage solution. If fructose polymers are used as a sweetening agent for this invention, from about 0.1 g to about 1000 g is used per 354 ml of beverage solution. Fructose polymers, as is known in the art, impart enhanced nutritional activity due to the way the substance is transported through the intestinal tract and processed by the body.

If sucrose is used as the sweetener, from about 0.01 g to about 100 g is used per 354 ml of beverage solution. If Aspartame® is used as the sweetener, from about 0.05 g to about 30 g is used per 354 ml of beverage solution. If sucralose is used as the sweetener, from about 0.01 g to about 30 g is used per 354 ml of beverage solution. If glucose polymers are used as the sweetener, from about 0.01 g to about 1000 g is used per 354 ml of beverage solution. If glucose is used as the sweetener, from about 0.01 g to about 100 g is used per 354 ml of beverage solution. If Saccharine® is used as the sweetener, from about 0.01 g to about 10 g is used per 354 ml of beverage solution. If crystalline fructose, fructose polymers, glucose, glucose polymers, sucrose, Aspartame®, Saccharine®, sucralose and/or mixtures thereof are used as the sweetener, from about 0.01 g to about 200 g is used per 354 ml of beverage solution.

The flavoring agent is chosen from the following: chocolate fudge, chocolate, vanilla, strawberry, prairie berry, mocha, latte, peach, almond, coconut, raspberry, saskatoon berry, plains berry, apple, orange, butterscotch, coffee, blueberry and/or mixtures thereof. Flavors and/or mixtures thereof chosen from the list above will be added from about 0.01 g to about 50 g per 354 ml of beverage solution.

The preservative used is preferably natural and bacteriostatic. The preferred preservative is benzoic acid and/or a benzoate compound such as sodium benzoate, potassium benzoate, calcium benzoate and/or magnesium benzoate. When used in any and all embodiments of the invention, these compounds comprise from about 0.15 g to about 0.70 g of benzoic acid, sodium benzoate, potassium benzoate, calcium benzoate, magnesium benzoate and/or mixtures thereof per 354 ml of beverage solution.

To each 2 oz. of beverage solution is added from about 0.001 mg. to about 10,000 mg. magnesium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXX

The experiment in Example XXIX is repeated using a sports beverage, electrolyte replacement beverage, fluid replacement beverage or nutritional supplement beverage to each 2 oz. beverage solution is added from about 0.001 mg. to about 10,000 mg. magnesium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXXI

The experiment in Example XXX is repeated using a coffee beverage, caffeinated or decaffeinated, freshly brewed or instant. To each 2 oz. of beverage solution is added from about 0.001 mg. to about 10,000 mg. magnesium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXXII

The experiment in Example XXXI is repeated using a tea beverage, caffeinated or decaffeinated, freshly brewed or instant, herbal, green, Oolong or black. To each 2 oz. of beverage solution is added from about 0.001 mg. to about 10,000 mg. magnesium picolinate.

One hundred (100) human subjects are to be administered the beverage in 2 oz. quantities four (4) times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXXIII

The experiment in Example XXXII is repeated using a nonalcoholic beer or wine. To each 2 oz. of beverage solution is added from about 0.001 mg. to about 10,000 mg. magnesium picolinate.

One hundred (100) human subjects were administered the beverage in 2 oz. quantities four (4) times daily. Routine Finite samples were taken on the subjects and it was found that in the urine of over ninety (90%) percent of the subjects there were appreciable residues of picolinic acid proving that the magnesium in the chelate, magnesium picolinate, exhibited a high degree of bioavailability in the beverage preparations.

EXAMPLE XXXIV

The experiment in Example XXXIII is repeated using a soy or rice based beverage. To each 2 oz. of beverage solution is added from about 0.001 mg. to about 10,000 mg. magnesium picolinate.

One hundred (100) human subjects are to be administered the beverage in 2 oz. quantities four times daily. If routine urine samples are taken from the subjects, it is expected that over ninety (90%) percent of the subjects will have appreciable residues of picolinic acid in their urine. Such results will demonstrate that the magnesium in the chelate, magnesium picolinate, exhibits a high degree of bioavailability in the beverage preparations.

EXAMPLE XXXV

The experiment in Example XXXIV is repeated using the following foods containing per 2 oz. from about 0.001 mg. to about 10,000 mg. magnesium picolinate. The same results as in Example XXXIV are expected.

Baby foods, baking sodas and powders, baked goods such as breads, cookies, cakes, crackers, pastries and pies, breakfast mixes, butters and margarines, cake, muffin and bread mixes, prepared icings, pie crusts mix, cookie, brownie, pancake and waffle mixes, candies, canned fruits, vegetables and beans, canned pie fillings, canned meats and fish, cheeses, cocktail mixes, condiments, dried milk and flavored dried milk products, enriched chocolates and butterscotch for baking, enriched salt products, enriched seasonings, flours and meals, frozen prepared dinners, fruit sauces, gravies, gelatins and puddings, hot and cold cereals, ice creams, sherbets, yogurts and sorbets, jams, jellies, kosher foods, Mexican foods, Oriental foods, oils for salads and cooking, pastas, pectins, pizzas, prepared meats for cold cuts, prepared salads, preserves, sauces, salad dressings, soups, stews and chillies, special popcorn preparations, sweeteners both nutritive and non-nutritive, supplements to frozen foods, vegetables and desserts, syrups, and vinegars to name a few.

EXAMPLE XXXVI

The experiment in Example XXXV is repeated using pharmaceutical preparations such as tablets, powders or capsules for oral administration which contain from about 0.001 mg. to about 10,000 mg. magnesium picolinate per unit and/or suppositories for rectal administration containing from about 0.001 mg. to about 10,000 mg. magnesium picolinate per unit and/or syrups, elixirs, extracts, tonics, or other liquid or semi-solid preparations for oral administration containing per 2 oz. from about 0.001 mg. to about 10,000 mg. magnesium picolinate and/or injectable preparations and/or topical preparations containing from about 0.001 mg. to about 10,000 mg. magnesium picolinate. The same results as in Example XXXV are expected.

All mixtures, formulations and combinations of this invention provide a highly bioavailable form of calcium, magnesium and/or potassium for nutrient supplementation in the human diet. It is to be understood that the sequence of adding the mineral salts to food or beverage, as set forth herein is not essential to the production of the food or beverage preparation with one exception. It is important that the calcium picolinate be added to the mixture before the magnesium picolinate to prevent undesired clumping.

Having described the invention, it should be understood that the foregoing description of the invention is intended merely to be illustrative thereof and that other modifications, embodiments and equivalents may be apparent to those who are skilled in the art without departing from its spirit. Having thus described the invention what we claim as new and desire to secure by United States letters patent is:

What is claimed is:

1. A nutritionally enhanced beverage composition suitable for human consumption comprising:
   a liquid selected from the group consisting of milk, milk-based beverage, and mixtures thereof; and
   calcium picolinate.

2. The composition of claim 1 wherein from about 0.0001 mg to about 10,000.00 mg calcium picolinate is provided per 2 ounces of the composition.

3. The composition of claim 1 further comprising a sweetener selected from the group consisting of nutritive and non-nutritive sweeteners.

4. The composition of claim 1 further comprising an acidulant.

5. The composition of claim 1 further comprising a flavor enhancer selected from the group consisting of flavoring agents, flavor potentiators and mixtures thereof.

6. The composition of claim 1 further comprising a color additive.

7. The composition of claim 1 further comprising a preservative.

8. The composition of claim 1 further comprising:
   a sweetener selected from the group consisting of nutritive and non-nutritive sweeteners;
   an acidulant;
   a flavor enhancer selected from the group consisting of flavoring agents, flavor potentiators and mixtures thereof;
   a color additive; and
   a preservative.

9. A nutritionally enhanced beverage composition suitable for human consumption comprising:
   a liquid selected from the group consisting of milk, milk-based beverage, and mixtures thereof; and
   potassium picolinate.

10. The composition of claim 9 wherein from about 0.0001 mg to about 10,000.00 mg potassium picolinate is provided per 2 ounces of the composition.

11. A nutritionally enhanced beverage composition suitable for human consumption comprising:
    a liquid selected from the group consisting of milk, milk-based beverage, and mixtures thereof; and
    magnesium picolinate.

12. The composition of claim 11 wherein from about 0.0001 mg to about 10,000.00 mg magnesium picolinate is provided per 2 ounces of the composition.

13. A nutritionally enhanced beverage composition suitable for human consumption comprising:
    a liquid selected from the group consisting of milk, milk-based beverage, and mixtures thereof; and
    an amino acid salt selected from the group consisting of calcium picolinate, potassium picolinate, magnesium picolinate and mixtures thereof.

14. The composition of claim 13 wherein from about 0.0001 mg to about 10,000.00 mg of the amino acid chelate is provided per 2 ounces of the composition.

* * * * *